April 16, 1935.  J. J. BOUCHARD  1,997,852
PISTON RING SQUEEZER
Filed Nov. 19, 1934
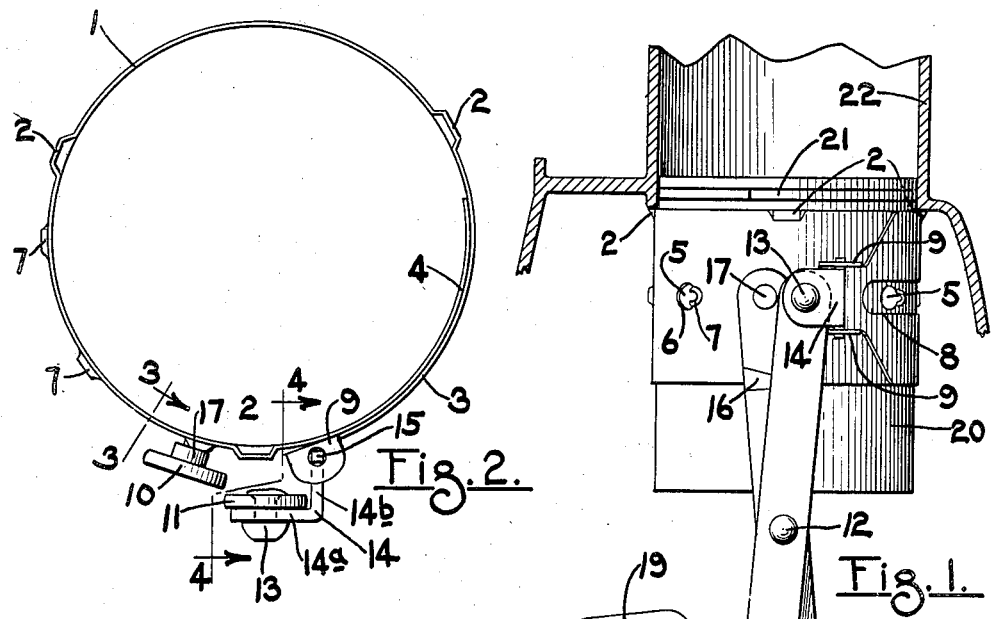
Inventor
Joseph J. Bouchard
By Livrana &
Van Antwerp
Attorneys Patented Apr. 16, 1935

1,997,852

UNITED STATES PATENT OFFICE 1,997,852

PISTON RING SQUEEZER

Joseph J. Bouchard, Grand Rapids, Mich.

Application November 19, 1934, Serial No. 753,575

4 Claims. (Cl. 29—86.4)

This invention relates to a device for compressing piston rings to a reduced diameter so that they and the piston they are mounted on, may be inserted in the cylinder of an internal combustion engine.

This invention is an improvement over such devices as disclosed in the patents to Claire for piston ring squeezers, issued March 30, 1920, numbers 1,335,367 and 1,335,658. The piston ring squeezers shown in the patents are designed to reduce the diameter of piston rings for insertion into the cylinder of an internal combustion engine. The present invention has certain improvements which will appear hereafter.

It is the primary purpose and object of the present invention to provide a simple and effective device for accomplishing the aforementioned operation of squeezing the rings to a reduced diameter for insertion into the cylinder.

The piston and rings are inserted into the cylinder from either the combustion chamber end or the crank case end of the cylinder. The ring squeezers shown in the patents, above referred to and other devices of this nature that are known, are designed for use only when the rings are inserted from the combustion chamber end of the cylinder. It is a further object of the present invention to provide a ring compressing tool which will be as applicable for use whether the rings are inserted from the crank case end or the combustion chamber end of the cylinder.

Another object of the invention is to provide means for a ring compressing tool for holding the tool locked with the rings under compression so that when the rings are compressed the device is locked and the operator may release the operating handles and thereby have both hands free for other operations.

Another feature is the novel means provided by outturned abutments at the bottom edge of the band to prevent the thin compression band from inadvertently entering the cylinder while the piston and rings are forced into the cylinder.

An understanding of the invention may be had from the following detailed description, taken in connection with the accompanying drawing, in which;

Fig. 1 is an elevation of a piston ring squeezer made in accordance with my invention showing the squeezer around a piston, squeezing the rings thereon, the piston and rings being partially inserted in the cylinder from the crankcase end thereof, the cylinder being shown in section.

Fig. 2 is a plan view of the squeezer.

Fig. 3 is a vertical section through the band of the squeezer taken along line 3—3 of Fig. 2, showing the detachable connection at one end of one of the handle members.

Fig. 4 is a vertical section through the band taken along line 4—4 of Fig. 2 showing the permanent connection at the corresponding end of the other handle member.

Fig. 5 is a horizontal sectional view through the handle members taken along line 5—5 in Fig. 1 showing the clamping link for locking the handles with the band under compression.

Fig. 6 is a fragmentary view of the underlapping end of the band showing one of the bayonet slots formed therein, and Fig. 7 is a view of the band before it is bent into cylindrical form.

Like reference numerals refer to like parts throughout the several views of the drawing.

In the construction of the piston squeezer, a band 1, bent into cylindrical form, is provided having outwardly extending abutments 2 along its outer edge, one end 3 of the band overlapping the other end 4 of the band. The underlapping end 4 of the band is provided with a number of key-hole slots 5 along its length midway between its edges. Each slot comprises a circular opening 6 and a smaller semi-circular opening 7, the opening 7 being bent outwardly from the plane of the band. The overlapping end 3 of the band has the longitudinal slot 8 formed therein in line with the key-hole slots 5 so that the outwardly bent portions 7 of the key-hole slots 5 may slide in the longitudinal slot 8 when the squeezer is in use. The outer end of the overlapping end 3 of the band is reduced in width and the ears 9 are bent laterally therefrom as shown in Fig. 4.

An operating handle is provided having the members 10 and 11 pivoted at 12 near the inner ends of the levers. The handle member 10 is pivoted, at its shorter end, at 13, to one arm 14a of the L-shaped bracket member 14. The other arm 14b of the bracket member is provided with tongues 15 which extend into openings in the ears 9 to provide a permanent pivotal connection for the handle member 10 to one end of the band. The other handle member 11 is twisted slightly as shown at 16 to bring the face of the handle member more nearly parallel to a tangent to the cylindrical band. The handle member 11 has a connecting pin 17, having an enlarged head 18, attached to its shorter end to engage with the key-hole slots 5 for adjustment of the cylindrical band to varying diameters.

The openings 6 of the bayonet slots 5 are large enough to permit the head 18 of the pin 17 to pass therethrough whereas the semi-circular openings 7 of the slots 5 are small enough to engage the head of the pin 17 to prevent longitudinal removal therefrom. The head 18 of the pin 17 and the outward extensions of the openings 7 of the slots are of the proper proportion that the head of the pin will be positioned outwardly of the inner surface of the band when in the various adjustable positions.

A clamping link 19 is positioned around the handle members 10 and 11 so that when the band is reduced in diameter to compress the rings sufficiently the handles may be locked or clamped in such condition so that the operators hands may be free for other operations. During the application of the tool to the piston and rings the parts may be so held as to cause the link 19 to expediently gravitate to locking position.

In operation the device is adjusted to the proper size by moving the connecting pin on the end of the lever 11 into the desired key-hole slot 5. The squeezer is then positioned around the piston 20 so as to envelope all the rings 21 on the piston after which the handles are operated to bring the band to a reduced diameter whereby the peripheries of the rings are brought even with the face of the piston. The handle members are then locked in this position, by the clamping link 19. The piston is inserted into the cylinder 22 of the combustion engine until the abutments 2 come against the end of the cylinder. The piston and rings are then moved out of the squeezer into the cylinder.

It will be noted that the handle members 10 and 11 are connected to the band at a point midway between its upper and lower edges and thence extend away from the band in a direction parallel to its axis. The handles being mounted in this way permits of use of the tool for inserting the piston and rings from the crank case end of the cylinder. If the handles extended radially from the band, insertion of the piston and rings into the cylinder would be impossible under certain conditions, particularly when inserting through the crank case.

The invention is defined in the appended claims and is to be considered comprehensive of all forms of structure coming within their scope.

I claim:

1. A device of the character described comprising, a flat metal band bent into cylindrical form, one end of said band overlapping the other, the underlapping portion of said band having connecting means extending therefrom, said connecting means lying adjacent the overlapping portion of the band, said overlapping portion of the band having an opening therein to encircle the projecting connecting means whereby the overlapping portions of the band will lie against each other, compressing means connected to the overlapping end of the band and said connecting means to removably attach it to the underlapping end of the band.

2. A device of the character described comprising, a flat metal band bent into cylindrical form, one end of said band overlapping the other, the underlapping portion of said band having connecting means extending therefrom, said connecting means lying adjacent the overlapping portion of the band, means on the overlapping end of said band whereby the outwardly extending connecting means on the underlapping end of the band can extend outwardly of the inner surface of the overlapping portion whereby the overlapping portions of the band will lie against each other, compressing means connected to the overlapping end of the band and said connecting means to removably attach it to the underlapping end of the band.

3. A device of the character described comprising, a compression band, compression means attached to one end of the band and removably connected to another part of the band, said removable connection on the compression means comprising a pin with an enlarged head, said pin removably connected into a key-hole slot in said band, the small portion of said key-hole slot being bent outwardly from the inner surface of the band whereby the head of said pin will lie outwardly relative to the inner surface of the band.

4. A device of the character described comprising, a band bent in cylindrical form and having overlapping ends, compressing means pivotally attached to both ends of the band, said compressing means comprising pivoted handle members extending parallel to the axis of said band, one of said handle members being pivoted on a radiant of the cylindrical band and also pivoted at right angles to said radiant, the other of said handle members being twisted and pivoted whereby it will pivot substantially on the radiant on which it centers.

JOSEPH J. BOUCHARD.